(12) United States Patent
Raviola

(10) Patent No.: US 8,285,410 B2
(45) Date of Patent: Oct. 9, 2012

(54) METHOD FOR MODELING AND EXECUTING A PRODUCTION RULE IN A DISCRETE MANUFACTURING SCENARIO

(75) Inventor: Alessandro Raviola, Genua (IT)

(73) Assignee: Siemens Aktiengesellschaft, Munich (DE)

( * ) Notice: Subject to any disclaimer, the term of this patent is extended or adjusted under 35 U.S.C. 154(b) by 359 days.

(21) Appl. No.: 12/464,137

(22) Filed: May 12, 2009

(65) Prior Publication Data

US 2009/0287337 A1 Nov. 19, 2009

(30) Foreign Application Priority Data

May 14, 2008 (EP) .................................. 08008880

(51) Int. Cl.
*G06F 19/00* (2011.01)
*G06F 9/455* (2006.01)
*G06F 9/44* (2006.01)
*G05B 11/01* (2006.01)

(52) U.S. Cl. ............. 700/103; 700/11; 703/27; 717/105
(58) Field of Classification Search .................... 700/11, 700/103; 717/105; 703/27
See application file for complete search history.

(56) References Cited

U.S. PATENT DOCUMENTS 5,317,757 A * 5/1994 Medicke et al. ............. 712/229
5,459,841 A * 10/1995 Flora-Holmquist et al. .... 326/37
5,835,688 A * 11/1998 Fromherz .................... 358/1.13
6,059,837 A * 5/2000 Kukula et al. .................. 703/27
2003/0066050 A1 * 4/2003 Wang et al. ................... 717/105

FOREIGN PATENT DOCUMENTS

EP 0747791 A2 12/1996
GB 2341240 A 3/2000

OTHER PUBLICATIONS

Koskimies, et al "Automatic Synthesis of State Machines from Trace Diagrams", Software-Practice and Experience, vol. 24(7), XP-000655465, Jul. 1994, pp. 643-658.

* cited by examiner

*Primary Examiner* — Mohammad Ali
*Assistant Examiner* — Sivalingam Sivanesan
(74) *Attorney, Agent, or Firm* — Laurence A. Greenberg; Werner H. Stemer; Ralph E. Locher

(57) ABSTRACT

A method for modeling and executing a production rule of a production phase in a discrete manufacturing scenario, whereby the production rule is associated to a process element and contains predefined production steps and predefined dependencies between the production steps, contains the steps of loading a production rule into a production order manager, parsing the production rule, and retrieving the predefined production steps and the predefined dependencies. Optionally user-defined parameters for the predefined production steps and the predefined dependencies are input. A state machine is created and contains the production steps labeled each as a predefined state, and further contains the dependencies labeled each as a predefined transition between two predefined states. The state machine is then forwarded to a process controller.

5 Claims, No Drawings

METHOD FOR MODELING AND EXECUTING A PRODUCTION RULE IN A DISCRETE MANUFACTURING SCENARIO

CROSS-REFERENCE TO RELATED APPLICATION

This application claims the priority, under 35 U.S.C. §119, of German application EP 08 008 880.0, filed May 14, 2008; the prior application is herewith incorporated by reference in its entirety.

BACKGROUND OF THE INVENTION

Field of the Invention:
The invention relates to a method for modeling and executing a production rule in a discrete manufacturing scenario, especially in the field of manufacturing execution systems.

Discrete manufacturing is related to production or assembly of discrete parts easily identifiable. Main characteristics of this category of manufacturing are low level automation or relevant manual activities, high flexibility and uncertainty of information. Depending on the scenario, there may be few processes running concurrently. In many cases the processes don't run continuously, but they are rather composed of a number of single steps which have to be carried out at certain points in time, mostly according to a manual schedule, meaning that an operator triggers each step manually, rather than a schedule provided by a process controller. In these scenarios, a continuously active process doesn't fit very well in a production phase, as only short actions have to be carried out and long pauses follow.

Prior art solutions, in automatizing a production phase, use an approach of modeling a production process by specifying a single production rule coordinated by the process controller. Usual situations in the discrete manufacturing scenario, like for example pause, manual command, start of a small portion of the production rule, etc., is managed by waiting for events, thus setting the production rule in an infinite loop state until a certain event occurs, in other words pausing the production rule, but always leaving the production rule active. Consequently, resources of the process controller are consumed by keeping the rule active but paused. Furthermore, the process controller has to distinguish between numerous events received and dispatch the correct event to the production rule, thus causing a high CPU effort.

SUMMARY OF THE INVENTION

It is accordingly an object of the invention to provide a method for modeling and executing a production rule in a discrete manufacturing scenario that overcomes the above-mentioned disadvantages of the prior art methods of this general type.

One goal to be achieved is to provide a method for reducing CPU load and managing the production rule in an effective way.

One way the goal is achieved is by providing a method for modeling and executing a production rule of a production phase in a discrete manufacturing scenario, whereby the production rule is associated to a process element and contains predefined production steps and predefined dependencies between the production steps. The method includes the steps of: loading a production rule into a production order manager; parsing the production rule and retrieving the predefined production steps and the predefined dependencies; optionally inputting user-defined parameters for the predefined production steps and the predefined dependencies; creating a state machine containing the production steps labeled each one as a predefined state, and further containing the dependencies labeled each one as a predefined transition between two predefined states; and forwarding the state machine to a process controller.

In a first step, the production rule is loaded into the production order manager (POM), the software being responsible for providing a set of sub rules which later will be used in the production phase.

In a second and a third step the production order manager retrieves all predefined production steps and dependencies and gives the operator the possibility to adjust parameters related to any of the production steps and dependencies. The sub rules mentioned above are to be understood as production steps and/or dependencies.

In a fourth step, the production order manager creates a state machine based on the production steps, the dependencies and the user-defined parameters. Out of each production step it creates a state and out of each dependency it creates a transition between two states. As soon as the state machine has been modeled, it is then forwarded to the process controller which takes over a dispatching of elements of the state machine.

Other features which are considered as characteristic for the invention are set forth in the appended claims.

Although the invention is described herein as embodied in a method for modeling and executing a production rule in a discrete manufacturing scenario, it is nevertheless not intended to be limited to the details described, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments.

DETAILED DESCRIPTION OF THE INVENTION

The main advantage of the proposed solution is that the process controller has the possibility to dispatch an element of the state machine only when the element is needed. This results from the definition of a state machine, in this case being composed of abstract objects, meaning the states and the transitions. As soon as a certain state has been completed because the production phase moves to a subsequent state by a certain transition, a first object associated with the certain state and a second object associated with the certain transition are deleted from memory. Thus, there is no need for the process controller to take into account the objects. For this reason, memory is saved and the CPU load used by the process controller is reduced.

According to a preferred method, the state machine corresponding to the production rule is loaded into a memory device associated with the process controller. The memory device is accessible on one hand by the production order manager POM, which loads the state machine into the memory and on the other hand by the process controller, which executes steps specified in the state machine.

The process controller manages the production rule by carrying out the steps of retrieving status information about a production state of the process element, matching the production state to a specific predefined state contained in the state machine, retrieving information about a specific predefined transition following the specific state, dispatching an action specified by the specific transition to the process element, deactivating a totality of controller routines associated with the specific predefined state and with the specific predefined transition, returning to the step of retrieving status information, until a last predefined state has been reached.

In the step of retrieving status information, the process controller gathers data associated with the process element involved in the production phase. The process element is to be understood as an entity involved in the production. For example, a process element is a sensor, a spare part, an assembly part, etc. By this step, the process controller monitors the proceedings of a production phase and checks a current state of the element in order to decide if any action regarding the element has to be triggered. This is done by comparing the current state of the element with all predefined states associated with this element that are found in the state machine and picking the specific state which matches the current state of the element. Based on various criteria, like for example taking into account the user-defined parameters, the process controller may decide that an action has to be carried out to the element. For this purpose, the process controller determines all transitions associated with the specific state and identifies the specific transition to be executed. Subsequently, the process controller carries out an action described in the specific transition and deletes an instance of the specific state and the specific transition. Then the process controller returns to the step of retrieving the status information. This procedure is continued until the process element has been identified as having reached a last production state.

According to a preferred method, the process controller activates the state machine corresponding to the production rule as soon as it receives a command to execute the specific predefined transition. In other words, it is avoided that a suspended execution thread is kept alive but rather a function call is made as soon as an action regarding the production phase is necessary.

As soon as the action has been carried out and a subsequent state of the element has been reached, the process controller deactivates the state machine as soon as the specific predefined transition has been executed and a next predefined state has been reached.

In contrast to an infinite loop, the state machine is implemented as a process or as a thread, which is activated only when an operation has to be carried out and deactivated as soon as the operation has been completed. In other words, during the time that the state machine is deactivated, no operations at all are performed; thus, the thread or the process consumes a minimum of CPU time.

According to a preferred method, the process controller retrieves the information about the production state via a communication line connected to the process element. A communications interface is implanted for exchange of data between the process controller and the process elements. For example this interface uses the TCP/IP protocol.

The invention claimed is:

1. A method for modeling and executing a production rule associated with a process element and containing predefined production steps and predefined dependencies between the predefined production steps, which comprises the steps of:
   loading a production rule of a production phase in a discrete manufacturing scenario into a production order manager;
   parsing the production rule and retrieving the predefined production steps and the predefined dependencies;
   inputting user-defined parameters for the predefined production steps and the predefined dependencies, if necessary and available;
   creating a state machine containing the predefined production steps each labeled as a predefined state, and further containing the predefined dependencies each labeled as a predefined transition between two predefined states; and forwarding the state machine to a process controller in communication with the process element involved in the production phase of the discrete manufacturing scenario,
   wherein the process controller manages the production rule by carrying out the steps of:
   i) retrieving status information about a production state of the process element;
   ii) matching the production state to a specific predefined state contained in the state machine;
   iii) retrieving information about a specific predefined transition following the specific state;
   iv) dispatching an action specified by the specific predefined transition to the process element;
   v) deactivating a totality of controller routines associated with the specific predefined state and with the specific predefined transition; and
   vi) returning to step i) until a last predefined state has been reached.

2. The method according to claim 1, which further comprises loading the state machine corresponding to the production rule into a memory device associated with the process controller.

3. The method according to claim 1, which further comprises activating, via the process controller, the state machine corresponding to the production rule as soon as it receives a command to execute the specific predefined transition.

4. The method according to claim 1, which further comprises deactivating, via the process controller, the state machine as soon as the specific predefined transition has been executed and a next predefined state has been reached.

5. The method according to claim 1, wherein the process controller retrieves the information about the production state via a communication line connected to the process element.

* * * * *